Figures 1, 2, 3:
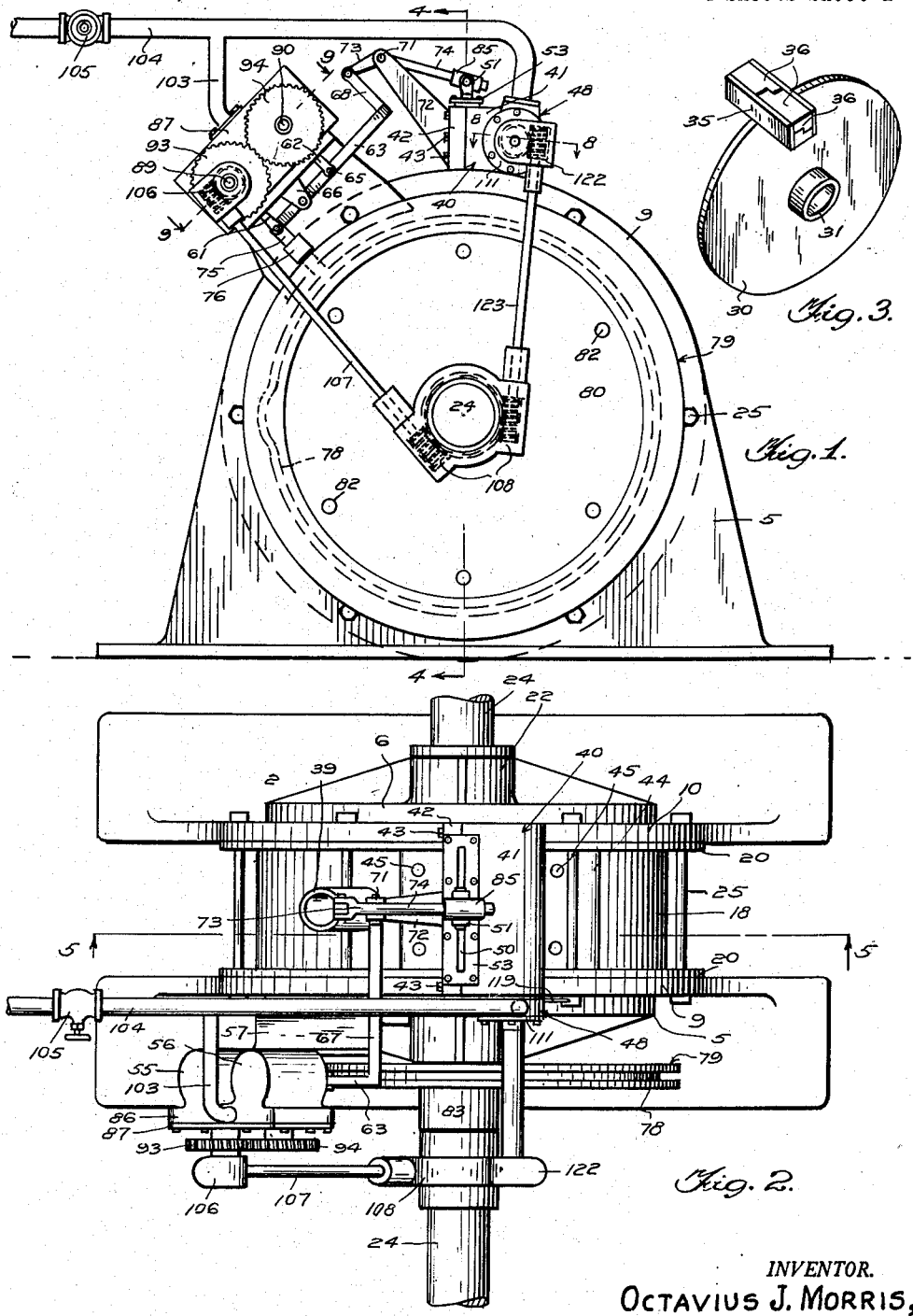

May 1, 1951      O. J. MORRIS      2,550,849
ROTARY ENGINE

Filed Nov. 12, 1948      4 Sheets-Sheet 1

INVENTOR.
OCTAVIUS J. MORRIS,
BY
ATTORNEY.

May 1, 1951 — O. J. MORRIS — 2,550,849
ROTARY ENGINE
Filed Nov. 12, 1948 — 4 Sheets-Sheet 2

INVENTOR.
OCTAVIUS J. MORRIS,
BY
ATTORNEY

May 1, 1951 O. J. MORRIS 2,550,849
ROTARY ENGINE
Filed Nov. 12, 1948 4 Sheets-Sheet 3

INVENTOR.
OCTAVIUS J. MORRIS,
BY
ATTORNEY

May 1, 1951   O. J. MORRIS   2,550,849
ROTARY ENGINE
Filed Nov. 12, 1948   4 Sheets-Sheet 4
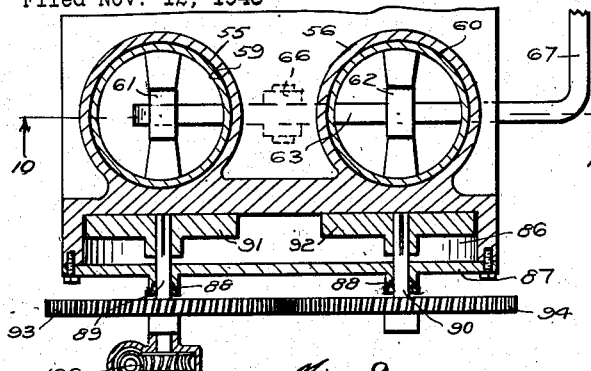
Fig. 9.
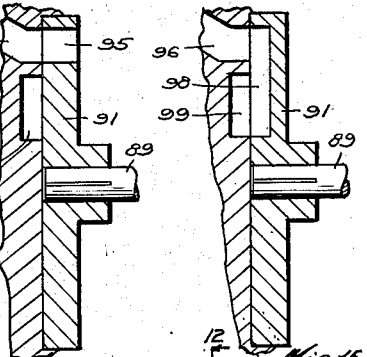
Fig. 14.   Fig. 15.
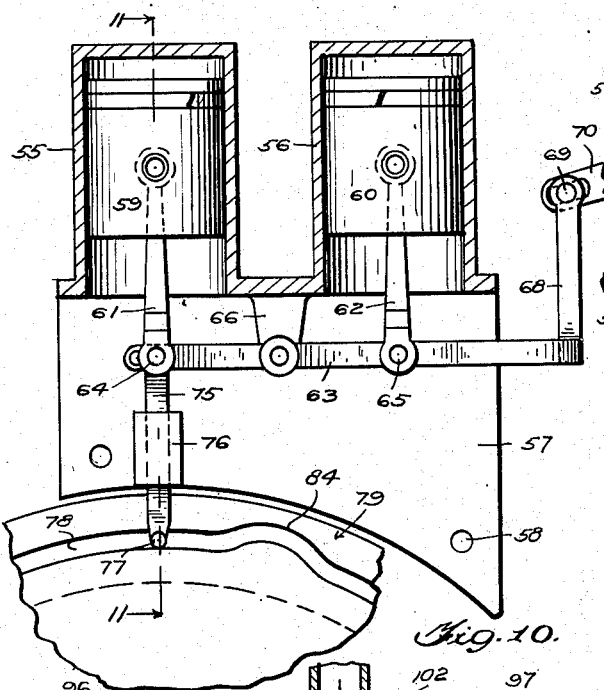
Fig. 10.
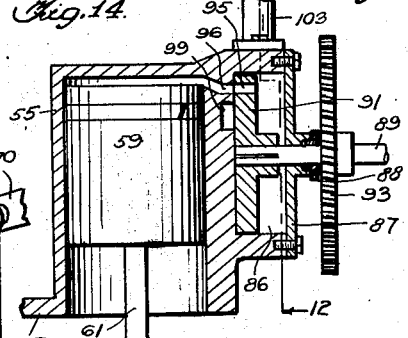
Fig. 11.
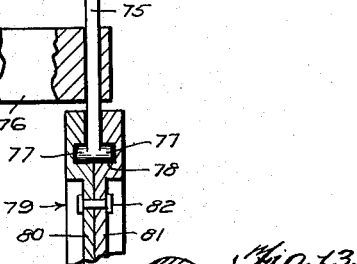
Fig. 13.
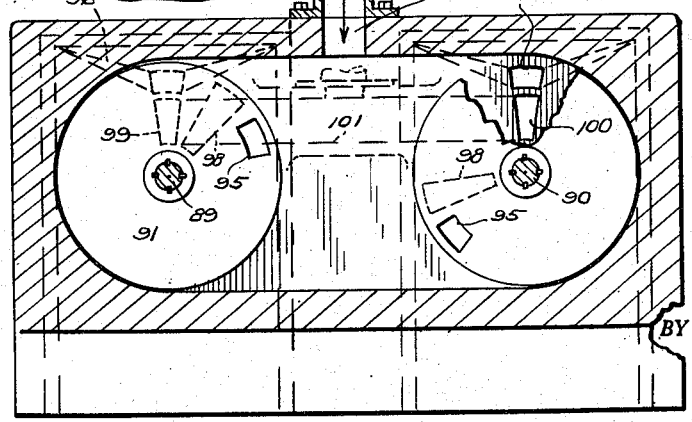
Fig. 12.
INVENTOR.
OCTAVIUS J. MORRIS,
BY
ATTORNEY.

Patented May 1, 1951

2,550,849

UNITED STATES PATENT OFFICE 2,550,849

ROTARY ENGINE

Octavius J. Morris, Miami, Fla.

Application November 12, 1948, Serial No. 59,589

5 Claims. (Cl. 121—73)

This invention relates to improvements in rotary engines of that type embodying a rotary piston and a sliding abutment for defining a piston chamber area as means for trapping a fluid motive force for action against the piston as a driving medium.

An object of the present invention resides in the provision of a rotary engine having an annular chamber in which is slidably mounted a piston to traverse the chamber, with a sliding abutment movable across the path of the piston as a trapping means for a fluid driving medium to expand against the piston, the abutment and piston being timed in their movement whereby the abutment will move out of the path of the piston under the action of novel control means for permitting the passage of the piston thereby.

A further object of the invention resides in the novel form of actuating mechanism for controlling the movement of the abutment to a fine degree and in a positive manner under the influence of a fluid medium corresponding to that employed in driving the piston.

A further object of the invention resides in novel valve means for controlling the inlet of the fluid drive medium to the chamber, with a novel governor automatically controlling the valve inlet opening for determining the speed of rotation of the engine.

Another object resides in the particular mechanism for actuating the abutment, including fluid pressure actuated pistons and fluid inlet to each piston for actuating linkage that controls the entry and withdrawal of the abutment at properly timed intervals during the rotation of the piston, with cam means providing a definite cycle of control for the pressure actuated pistons.

Another object resides in the novel construction of the cylinder, its inner wall construction, serving the dual function as one annular wall of cylinder and as a means for minimizing leakage of the fluid driving medium past the piston disc, with a plurality of pressure springs to maintain a bearing against the piston disc throughout its rotary movement.

Other features of novelty, including the piston and its supporting disc, balance means for the disc, the timed drive means for the several valves all driven from the main shaft and the particular frame construction and assembly, will be clearly apparent throughout the detailed description to be hereinafter set forth.

Figures 4, 16:
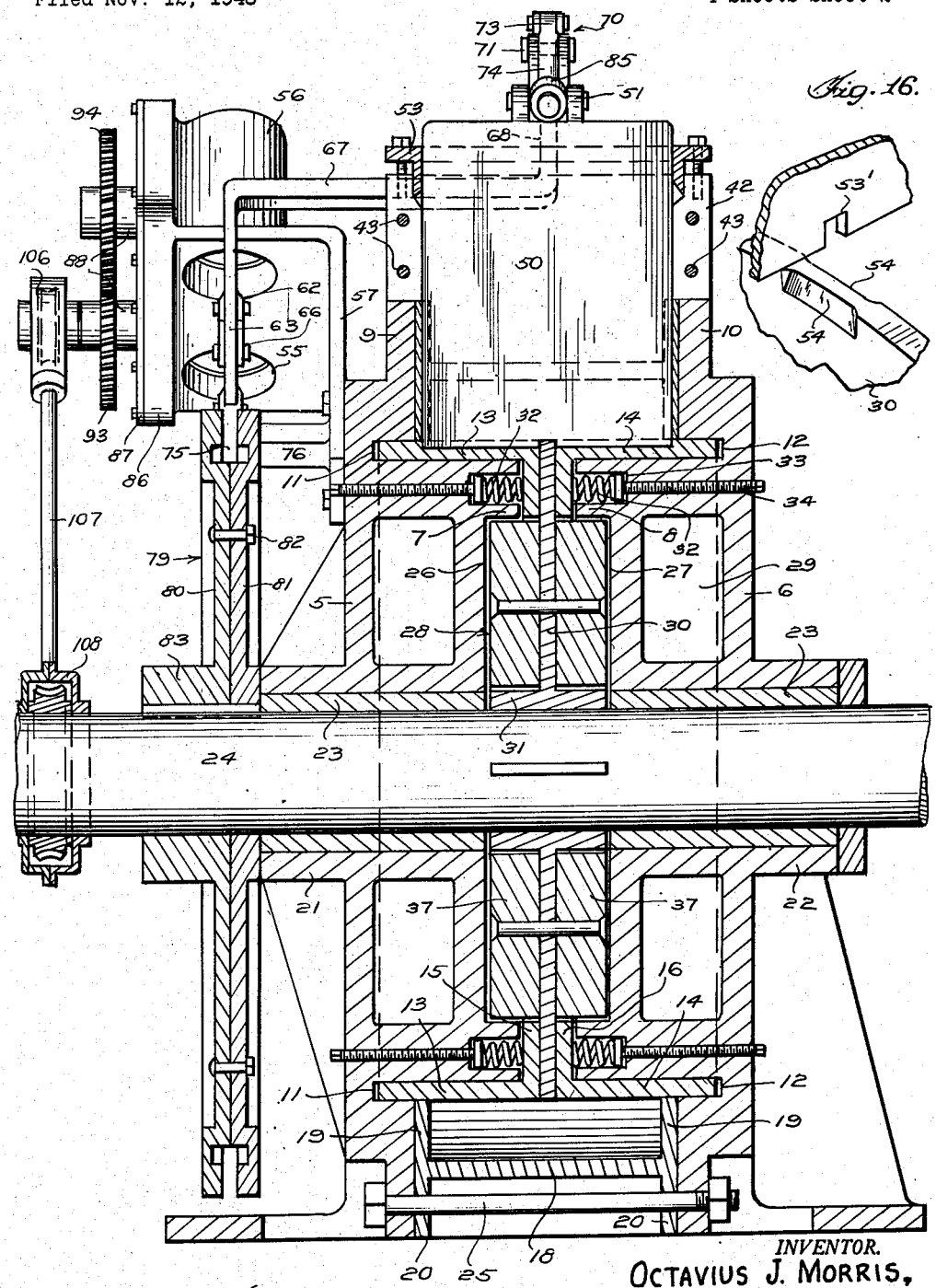
Figure 5:
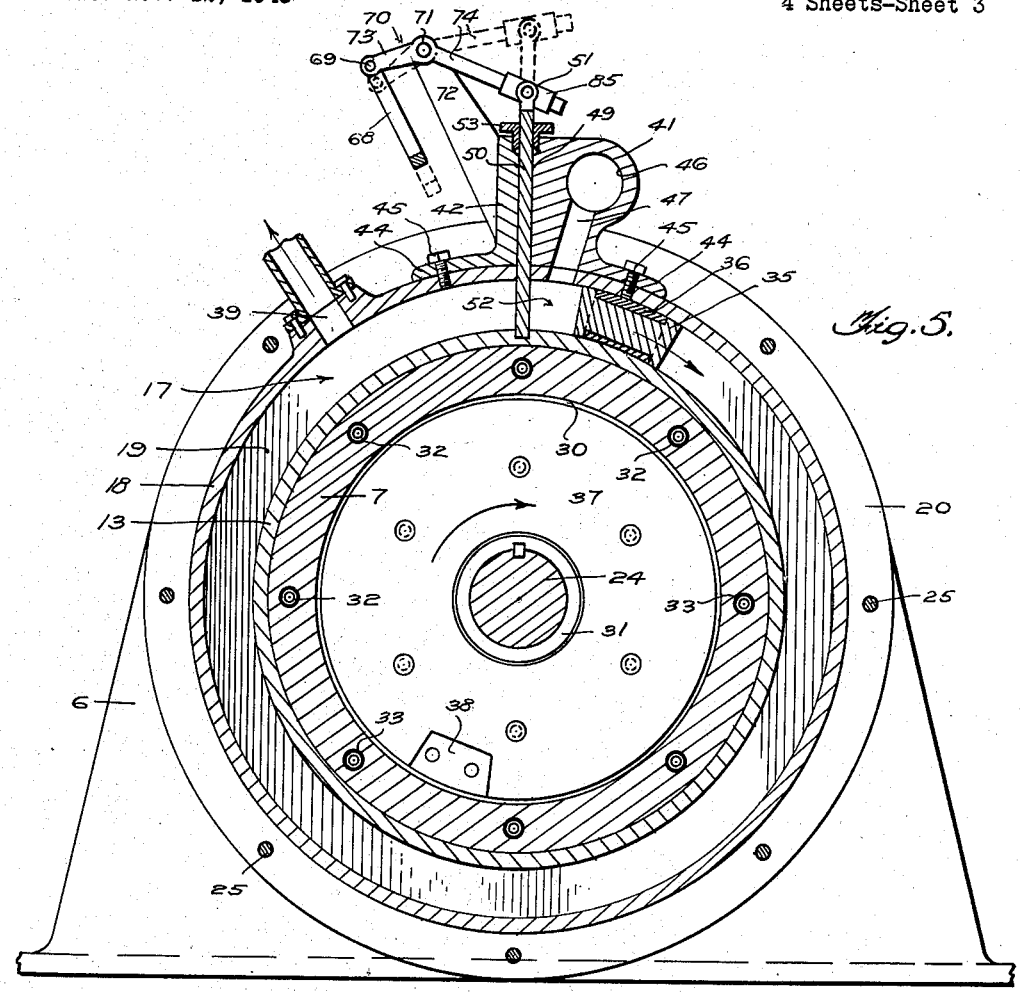
Figures 6, 7, 8:
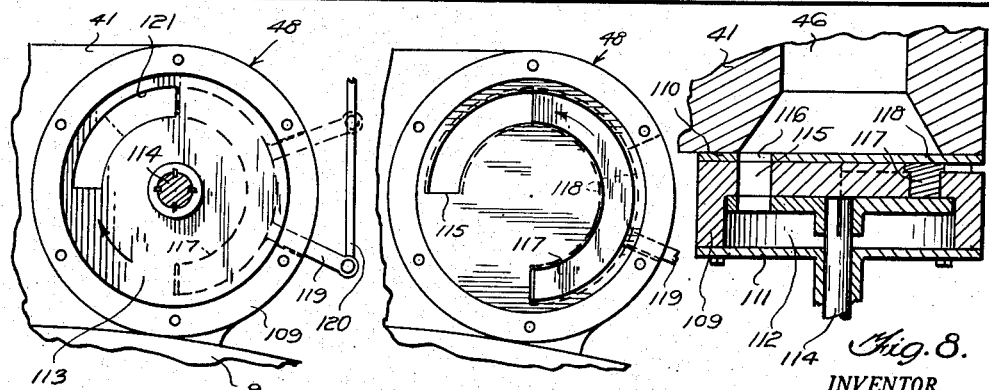

Referring to the drawings, wherein is shown a preferred embodiment of the invention and wherein like reference numerals refer to like parts throughout, Figure 1 is a side elevation of an engine constructed in accordance with the invention, Figure 2 is a plan view thereof, Figure 3 is a perspective view of a piston and piston disc, Figure 4 is a vertical longitudinal section of the engine on a slightly enlarged scale and taken on line 4—4 of Figure 1, Figure 5 is a transverse vertical section of the engine, taken substantially on line 5—5 of Figure 2, Figure 6 is an enlarged front elevation of a portion of the casting embodying the fluid drive medium inlet valve, with its cover plate removed, Figure 7 is a similar view with the valve disc removed to disclose the fluid passage opening and a governor controlled segment for the opening, Figure 8 is a horizontal section through the inlet valve mechanism, taken on line 8—8 of Figure 1, Figure 9 is a horizontal section through the abutment control cylinders and associated parts, taken on line 9—9 of Figure 1, Figure 10 is a vertical section on line 10—10 of Figure 9, Figure 11 is a transverse section taken on line 11—11 of Figure 10, Figure 12 is a vertical section taken on line 12—12 of Figure 11, Figure 13 is a perspective view of one valve disc included in the abutment control mechanism, Figure 14 is a fragmentary vertical section illustrating one valve of Figure 13 in the inlet position, Figure 15 is a similar view illustrating the valve in the exhaust position and, Figure 16 is a fragmentary perspective of an edge of the piston disc with a short bevel for the abutment contact.

Referring specifically to the drawings, the numerals 5 and 6 indicate main engine castings, forming the body of the engine. Each casting is provided with inwardly extending concentric hubs 7 and 8 and upstanding annular flanges 9 and 10. The flanges adjacent their point of junction with the main body of the castings are under-cut, as shown at 11 and 12 and this under-cut is flush with the outer circumferential faces of the hubs 7 and 8. Seated upon the hubs 7 and 8 and laterally shiftable with respect thereto, are annular concentric rings 13 and 14 having an internal diameter of a size to snugly, but slidably engage over the annular faces of the hubs 7 and 8. The outer marginal edges of the rings 13 and 14 engage in the under-cuts 11 and 12. Each of the rings 13 and 14 are provided with inwardly directed right angle flanges 15 and 16. The circumferential faces of the rings 13 and 14, define, in conjunction with a piston disc, to be described, the inner wall of an annular chamber, the chamber being indicated generally by the numeral 17, see particularly Figure 5. The outer chamber wall is defined by a concentric ring 18, I-shaped in cross section, see particularly Figure 4. The inwardly and outwardly extending flanges 19 and 20 of the ring 18 serve as end walls for the chamber and as attaching flanges for connection with the casting flanges 9 and 10. As in Figure 4, the concentric ring 18 is circumferentially spaced from the rings 13 and 14 and, with the flanges 19, define a piston chamber 17, rectangular in cross-section, to be traversed by a piston, to be described. The frame members 5 and 6 are provided with elongated bearings 21 and 22, having suitable bearing liners 23 for the rotative support of a main engine shaft 24. The ring 18, with its flanges 19 and 20 are clamped between the flanges 9 and 10 of the frame members 5 and 6, by bolts 25, tightly drawn to prevent leakage past the flanges.

The clamping of the frame members 5 and 6 and the ring and flanges 18, 19 and 20, provide a rigid structure having an annular chamber 17. In assembled position, the hubs 7 and 8 are spaced apart a predetermined distance, while the hubs are under-cut, as at 26 and 27, to provide a flywheel chamber 28. The hubs 7 and 8, rings 13 and 14 and ring 18 are all concentric with the shaft 24. The castings 5 and 6 are further provided with preformed annular chambers 29 as a means for minimizing the weight of the engine and as an aid in cooling the parts. Suitable openings, not shown, extend from the chambers 29 to the atmosphere.

A piston disc 30, see Figures 3, 4 and 16, is provided with a hub 31, splined upon the shaft 24, for turning movement therewith. The circumferential edge of the disc 30 is concentric and flush with the circumferential faces of the chamber rings 13 and 14 and the sides of the disc have rotative sliding movement against the flanges 15 and 16. The flanges 15 and 16 are constantly urged into bearing against the sides of the disc 30, by a plurality of equidistantly spaced pressure springs 32, seated in recesses 33 of the hubs 7 and 8. Each spring 32 is adjustable as to pressure by threaded adjusting screws 34, having threaded engagement in the castings 5 and 6. Each screw 34 is provided with a hexagon head for convenience of operation. Thus, it will be seen, that the disc 30 is freely rotatable between the flanges 15 and 16, yet with the pressure of the flanges being sufficient to prevent leakage thereby. The piston disc 30 carries a generally rectangular shaped piston 35, formed integral therewith, or attached in any convenient manner to travel with the disc. The inner and outer faces of the piston are formed on the arcs of the rings 13 and 14 and the ring 18 and is of a size to slidably traverse the chamber 17 with just sufficient clearance. Suitable packing strips 36 are provided for the piston 35 against leakage of the fluid driving medium in use. These packing strips may be any desirable form, best suitable for this particular use and certain of the strips may extend along the inner face of the piston for engagement with the rings 13 and 14. Arranged upon opposite sides of the disc 30 are balance discs 37, riveted thereto and rotatable with the piston disc. The piston disc 30 may be further suitably balanced to compensate for the piston weight by the insertion of weighted segments 38, see Figure 5. The discs 37 are preferably formed of some light weight metal, such as aluminum. The chamber 28 is of sufficient size as to freely accommodate the discs 37.

From the foregoing, it will be seen that a rigid pair of frame members having annular rings rigidly positioned therebetween for forming an annular piston chamber with a piston and piston disc rotatably supported whereby the piston traverses the chamber mounted therein, all forming a unitary structure, the several parts of which may be assembled or disassembled with considerable ease, for cleaning and replacement of possible worn parts. The outer chamber wall, defined by the ring 18, is provided with an exhaust port 39, leading to the atmosphere, or to any convenient point of discharge.

Since this form of engine has been designed for use with a fluid driving medium, particularly steam, it becomes necessary that means be provided to define an expansion chamber with the piston 35 and a control means for the periodic entry of steam to be expanded in the chamber. To provide for this contingency, a casting has been formed as a supporting medium for the control parts, designated at 40. This casting is formed in two parts 41 and 42, being bolted together at 43 and provided with attaching flanges 44, bolted to the outer face of the ring 18, as at 45. The part 41 is provided with a steam inlet channel 46, communicating with the interior of the chamber through a port 47. The forward end of the channel 46 is formed open, see Figure 8 and this opening is closed by a periodically controlled valve device, indicated as a whole by the numeral 48. The two parts of the castings 41 and 42, along their meeting faces, are milled out to jointly form a vertically arranged abutment guide 49. The milled channel forming the guide may be provided with suitable liners, not shown, calculated to reduce wear and to permit a slight reduction in the width of the guide by removal of shims or the like from between the abutting sides of the castings, not shown. The provision of this means for maintaining accurate sliding movement of an abutment in the guide is a mere mechanical expedient and forms no essential part of this engine. The guide opening extends through the ring 18 and the chamber side walls, formed by the flanges 19 and 20, are grooved to correspond to the length of the guide. The inner chamber wall, formed by the rings 13 and 14, is likewise grooved transversely in alignment with the guide to form a seat for the abutment.

The abutment 50, comprises a flat, generally rectangular plate of a width and thickness to maintain a snug slidable movement in the guide against leakage. An operating head 51 is carried by the abutment for engagement by linkage, to be described. The abutment is adapted to move in a vertical direction under the influence of control means and so timed as to be raised for permitting the movement of the piston in its travel and to promptly be lowered to abutment position when the piston has passed, to provide, with the piston, an expansion chamber 52. At the moment the piston uncovers the port 47 and the abutment has been moved to closed position, steam is admitted by the valve mechanism 48. Suitable packing is provided for the abutment, indicated at 53, to minimize leakage during the rapid vertical sliding movement of the abutment. Since the seating of the abutment in the grooves formed in the rings 13 and 14 would cause the lower edge of the abutment to engage the edge of the piston disc 30, the abutment has been cut out at 53', to a depth equal to the depth of the grooves and a width equal to the thickness of the piston disc 30. Thus, the abutment may freely seat within the grooves without interference to the free rotation of the disc 30. To insure of a proper seating of the abutment at such time as slight wear may develop in the guide 49, the opposite edges of the disc 30 have been bevelled at 54 for a short distance and at the point where the abutment is moved to closed position. This bevel insures that the cut-out 53' will accurately engage over the edge of the disc under all conditions.

The means will now be described for controlling the movement of the abutment plate 50 and reference is made particularly to Figures 1, 2, 4, 5, and 9 to 15 inclusive. A pair of spaced cylinders 55 and 56, carried by a bracket 57, bolted to the frame of the engine, as at 58 are provided with slidable pistons 59 and 60, having connecting rods 61 and 62. The rods 61 and 62 have pivotal connection with a bar 63, as at 64 and 65 and the bar 63 is pivotally supported upon a bracket 66, carried by the bracket 57. The bar 63 is bent at a right angle to extend to substantially the transverse center of the engine, as shown at 67 and is then bent upwardly, at 68, for pivotal connection at 69, to a rocker arm 70. The pivotal connection 69 is obviously provided with a lost motion connection to permit free pivotal action of the parts. The rocker arm 70 is pivotally supported at 71, upon bracket arms 72, formed upon the casting section 42. The pivotal point 71 provides one short arm 73 and a long arm 74 for the rocker arm 70, the purpose of which is to provide a relatively long throw to the arm 74, with a minimum of motion to the arm 73. Positive limiting action of the pistons 59 and 60 and the resultant limited rocking motion of the bar 63 is controlled by a push rod 75, preferably rectangular in cross-section and slidable in a bracket guide 76, supported from the bracket 57. The movement of the push rod 75 is in direct axial alignment with the piston 59 and has pivotal connection with the connecting rod and bar 63 upon the pivot 64. The bar 63 is preferably slotted at the point of the pivot 64 to provide freedom of movement against binding. The push rod, at its outer end is equipped with a cross head, having oppositely extending and axially aligned cylindrical ends 77, operable in a guide groove 78 formed in a cam device, generally indicated at 79. The cam 79 is preferably formed in two parts or halves 80 and 81, bolted or riveted together, as at 82. Each cam half is formed identical, with the exception of an extended hub 83 on the outer half 80. The cam is splined to the shaft 24, as shown. The guide groove 78 is concentric with the shaft 24 for the major circumference of the cam and at a predetermined point in the timing of the engine, this groove is curved outwardly, as at 84 for a quick actuation of the push rod 75 a distance equal to the necessary rocking motion of the bar 63 for the actuation of the abutment to the clearance position. This movement is transmitted through the rocker arm 70 to the abutment head 51 for lifting the abutment quickly to permit passage of the piston 35. The long arm 74 is pivotally and slidably connected to the head 51, through the medium of a pivoted tubular member 85, such connection providing for a freely swinging and pivotal connection between the abutment head 51 and the arm 74 against binding. The actuation of the push rod 75 occurs once in each revolution of the piston and piston disc 30 and 35.

Since the pistons 59 and 60 are adapted to be power actuated in timed relation to the rotation of the engine, it becomes necessary to provide suitable valve mechanism for controlling the inlet of and exhaust of the actuating medium, in this instance being steam. The cylinders 55 and 56 are preferably formed integral by a casting, in which is formed an elongated steam chest 86, rounded at its inner ends and covered by a removable cover plate 87, bolted upon the face of the casting to provide a steam tight chamber. The cover plate 87 is provided with bearing sleeves 88, rotatably supporting valve shafts 89 and 90. The valve shafts 89 and 90 are centrally disposed with respect to the vertical axis of the cylinders and extend outwardly at right angle thereto. Identical valve discs 91 and 92 have a ground seating upon the inner wall of the steam chamber and are slidably splined upon the inner ends of the shafts 89 and 90, whereby steam pressure within the chamber will at all times keep them firmly seated. If found desirable, springs may be employed to insure of the constant seating of the valve discs. The shafts 89 and 90 are geared together by spiral gears 93 and 94 and revolve in timed relation to the rotation of the engine. Each valve disc 91 and 92 is provided with steam inlet ports 95 adapted to alternately register with inlet channels 96 and 97, leading to the cylinders 55 and 56 at a point adjacent their upper portions for directing steam to the heads of the pistons 59 and 60. The steam space between the piston and cylinder heads is relatively small and the channels 96 and 97 are directed upwardly and fan out to the reduced area of compression, as shown by dotted lines in Figure 12. Each disc 91 and 92 is provided with an exhaust channel 98 formed in the seating face of the disc, but unlike the ports 95, the channels do not extend entirely through the discs. The channels 98 are elongated and are adapted to overlie the inlet channels 96 and 97 and exhaust ports 99 and 100, as clearly shown in Figure 15. The ports 99 and 100 are connected by a common exhaust duct 101, formed in the casting, from which the exhaust steam may be conducted to any desirable point. A steam inlet opening 102 is formed in the casting and a steam line 103 has connection thereto, and maintains steam pressure at all times in the steam chamber, firmly seating the valves. Steam for the line 103 is taken from a main steam supply line 104, controlled by a shut-off valve 105. Means are provided to drive the valve shaft 89, comprising a worm and worm gear 106, driven by a shaft 107 from a worm and worm gear 108, carried by the shaft 24. Thus, the definite timed rotation of the shafts 89 and 90 is maintained at all times during the operation of the engine and at the proper sequence of valve actuation.

The operation of the valves 91 and 92 is believed to be apparent. As the piston disc and piston is rotated, obviously, it becomes essential that the abutment be momentarily lifted out of the path of travel of the piston 35. When the piston reaches a predetermined point of approach to the abutment, the outwardly curved portion of the cam 84 begins to engage and lift the push rod 75. At this time, the port 95 has uncovered the inlet port 97 to the cylinder 56 and steam is being admitted thereto for forcing the piston 60 downwardly, rocking the bar 63 and transmitting this motion through the rocker arm 70 to lift the abutment to clearance position. The degree of rocking motion for the bar 63 is limited by the pivotal engagement of the push rod 75. Immediately after the piston 35 has passed the abutment, the exhaust channel 98 of the disc 92 has uncovered the port 100 and steam is exhausted from the cylinder 56, relieving the piston for its up stroke. Immediately upon the start of the exhausting of the cylinder 56, the port 95 of the disc 91 starts to uncover the inlet channel to the cylinder 55, for rocking the bar 63 in the opposite direction, with the resultant shifting and closure of the abutment. Thus, while the cylinder 56 is exhausting, the cylinder 55 is receiving its charge of steam and, in this manner, there is no abrupt motion of the push rod in the cam groove, since the motion is cushioned by the opposite flow of the steam pressure to and from the cylinders 55 and 56. This cushioned motion relieves to a large extent a noisy cam action and will minimize wear of the push rod ends 77 and the cam groove. The offset groove 84 is calculated to be just sufficiently extended to insure of the proper interval of time for the momentary raising and lowering of the abutment and the timing of the valve discs coincides with the groove 84 to control the inlet and exhaust of the cylinders in their proper sequence. When the piston 59 has completed its downward travel, the push rod head 77 has again entered the concentric groove of the cam and the exhaust channel 98 of the disc 91 has established exhaust communication between the channel 96 and the exhaust port 99, after which, both pistons remain inactive until the piston 35 again approaches the abutment. While the pistons 59 and 60 have been shown as being actuated by steam, it will be obvious that other motivating forces may be employed, such as compressed air.

It now becomes necessary to provide means for periodically controlling the entry of steam or other driving medium to the chamber 17. The valve mechanism indicated as a whole by the numeral 48, comprises a combined steam chamber and valve housing 109. The valve mechanism includes an inner plate 110, the housing 109 and an outer cover plate 111. The housing 109 provides a chamber 112, having a ground inner recessed face for rotative engagement by a valve disc 113, slidably splined upon a rotatable drive shaft 114. Steam inlet is provided to the chamber 112 by the supply line 104. The inner wall of the housing is provided with an arcuate concentric port 115, extending entirely therethrough and registers with a corresponding port 116 formed in the plate 110. The ports extend for substantially one quarter of the circular housing and are permanently in communication with the steam channel 46 and port 47 of the casting 41. An arcuate and concentric segment 117 is slidably mounted in an extension of the port 115 and this segment is provided with marginal flanges 118 engaging in undercut grooves formed in the rear face of the body or housing 109. The flanges are calculated to minimize leakage of steam and the entire valve mechanism, including the housing 109, plate 110 and cover plate 111, is securely bolted to the inlet end of the casting 41. A control arm 119, carried by the segment 117, extends laterally through a slot in the housing and has connection with a link 120 controllable by any well known form of speed governor. The segment, under the influence of the speed governor will progressively reduce the size of the opening of the port 115 as the speed of the engine increases and the load decreases, thus economizing considerably on the amount of steam required. The valve disc 113 is provided with an arcuate concentric port 121 of a size equal to the ports 115 and 116 and is adapted to cover and uncover the port 115 at predetermined intervals properly timed with the rotation of the piston disc 30 and the position of the piston 35. The shaft 114 is driven through the medium of a worm and worm gear 122, from a shaft 123, in turn driven from the worm gear 108. Thus, the actuation of the valve 113 is in positive timed relation to the rotation of the shaft 24.

The operation of the valve 113 with respect to the piston 35 and abutment 50 will be as follows: As before described, the abutment raises out of the path of travel of the piston 35 and immediately upon the passage of the piston, the abutment moves to closure position, forming with the piston 35, an expansion chamber 52. Immediately upon the passage of the piston 35 sufficiently far to uncover the port 47, steam enters the chamber 52, expanding against the piston for driving it around the cylinder 17. The normal period at which the valve 113 permits the flow of steam to the cylinder 17 is for substantially one half the revolution of the piston, since the steam starts to flow through the ports 115 and 116 at that point when the port 121 starts to uncover the port 115. The elapsed time for the flow of the steam will obviously depend on whether the segment 117 has been shifted to reduce the opening of the port 115. The piston 35 then continues its momentum until it passes the exhaust port 39.

In starting the engine, the valve 105 having been first opened, steam is admitted to the chambers 86 and 112. The engine is then manually rotated in any convenient manner and immediately upon the first impulse from the steam entering the chamber 52 and acting upon the piston 35, the several parts will start and continue to function automatically in timed relation to each cycle of the engine, which includes the initial charge of steam to the chamber 52, the rotation of the piston 35 and its disc 30 for rotating the main shaft 24, driving the cam 79, worm and worm gear 108 and controlling the valves 91 and 92 and their associated pistons 59 and 60 to actuate the abutment as the piston 35 approaches to a predetermined point. The valves 91 and 92 are so timed, that a momentary inlet and exhaust for the cylinders 55 and 56 is presented once for each revolution of the piston 35 and the elapsed time between the inlet and exhaust of the cylinder 56 and the inlet and exhaust of the cylinder 55 is just sufficient to raise the abutment from the path of the piston 35 and to immediately close it behind the piston 35. The use of power means for the abutment movement is both positive and quick in action and avoids the objectionable noise of cam operated abutments heretofore used in rotary engines.

It will be apparent from the foregoing description, that an extremely novel form of rotary engine has been provided. The parts are simple, but positive in action, providing mechanism that will permit of high speed rotation, with a minimum of moving parts. The structure is of such nature as to permit its manufacture at a relatively low cost, is simple to assemble and disassemble for replacement of worn or broken parts, all parts being conveniently arranged for easy access and is highly efficient in use.

The engine is of such a nature as to readily adapt it, with a minimum of changes, to an internal combustion engine, employing the same form of abutment operating means, but using compressed air for the cylinders 55 and 56, instead of steam. Suitable explosive charge forming, injecting and igniting means will be employed in lieu of the valve mechanism 48 and an application for patent covering such an engine will be later filed. The engine can also be readily adapted for use as a Diesel motor, with obvious changes in the fuel charge delivery means.

It is contemplated that the packing rings 36 of the piston 35 shall extend entirely across the top ends and bottom of the piston, and that the bottom rings shall be equipped with centrifugally operated means to maintain the ring in positive contact with the inner cylinder wall. Each of the shaft bearings 88 and the bearing sleeve for the shaft 114 shall be suitably packed against steam leakage, such packing being indicated in Figures 9, 11 and 12. Packing for the shaft 114 has not been shown, but its use is obvious.

It should be understood, that while a preferred embodiment of the invention has been shown and described, with specific operating mechanism to control the abutment and steam inlet to the cylinder, the invention is not limited to the precise arrangement, but that it includes within its purview, whatever changes fairly come within either the terms or the spirit of the appended claims.

Having described my invention, what I claim is:

1. A rotary engine of the character described comprising rigid frame members, a common drive shaft journalled in the members, a continuous annular piston chamber, concentric with the shaft and formed between the frame members, a piston disc splined on the shaft and extending into the chamber, a piston carried by the disc for traversing the chamber, a radial abutment movable across the chamber and in the line of travel of the piston, a steam inlet valve for controlling the inlet of steam to the chamber at a predetermined time, timing gears from the shaft for controlling the valve, a pair of cylinders carried by one of the frame members, pistons operable in the cylinders for alternate operation, valves for controlling the entry of steam alternately to each of the pair of cylinders, timed gearing for controlling the valves of the pair of cylinders, a bar shiftable in opposite directions movable under the influence of the last named pistons, a cam splined to the shaft for limiting the movement of the bar in either direction, an extension formed on the bar for overlying the piston chamber, a rocker arm connected with the extension, a rockshaft supporting the rocker arm and pivotal connection between the rocker arm and the abutment whereby the movement of the rocker arm controls the radial movement of the abutment.

2. The structure of claim 1, wherein the pair of cylinders are arranged parallel to each other in spaced relation and connected by a common casting, a combined steam chamber and valve chamber formed in the casting, rotary valve plates seated in the chamber, ports and recesses formed in the plates for the entry and exhaust of steam to and from the pair of cylinders, shafts rotatably supporting the plates, said shafts geared together for rotation in unison, a steam inlet line to the chamber, an exhaust outlet channel formed in the casting, a worm gear on the drive shaft, drive means from the worm gear to one of the plate shafts, said steam inlet valve for the chamber including a rotary valve plate provided with an inlet port, a drive shaft for the last named plate, gearing from the worm gear for driving the last named shaft and governor controlled means associated with the inlet valve for controlling the amount of steam passing therethrough.

3. The structure as recited in claim 2, wherein said steam inlet valve comprises a housing having a steam and rotary valve chamber formed therein, a cover plate bolted to the housing, said housing provided with an arcuate port for substantially one quarter of its circumference, a rotary valve plate engaging the inner wall of the chamber and provided with a port corresponding in shape and size to the housing port and adapted to register therewith, a shaft journalled in the cover plate and extending into the chamber, said valve plate slidably splined on the inner end of the shaft and held in seated position by the steam pressure in the chamber, said first named port having an arcuate extension in the housing, a segment slidable in the extension and adapted to progressively overlap the first named port, a radially extending arm from the segment for connection to a speed governor, a backing plate for the housing for maintaining the segment against displacement, said backing plate provided with an arcuate port corresponding in shape and size to the first named port and permanently registering therewith, said housing, backing plate and cover bolted together as a unit and having registry with an inlet port of the rotary engine, said valve shaft adapted to be driven from the drive shaft worm by timed gearing.

4. A rotary engine including a continuous circular and concentric piston chamber formed of concentric spaced rings, a pair of frame members for supporting the rings, a drive shaft journalled in the frame members concentric with the chamber, a piston disc carried by the shaft and carrying a piston for traversing the chamber, a casting bolted upon the outer side of the cylinder, an abutment slidable through the casting for movement into and out of the path of travel of the piston, said casting provided with a steam inlet channel and a steam port communicating with the interior of the chamber, a valve for controlling the entry of steam to the channel and port, a rocker arm having one end pivotally connected to the abutment, pivotal support bracket for the rocker arm, a pair of spaced parallel cylinders, a bracket for supporting the cylinders upon one of the frame members, pistons operable in the last named cylinders, connecting rods carried by the pistons, an elongated bar pivotally connected to the connecting rods and to an intermediate bracket carried by the cylinder bracket, said bar extended at one end and bent at a right angle to overlie the chamber substantially centrally thereof, said right angle bend then bent upwardly for pivotal connection with the rocker arm, said pair of cylinders including a combined steam and rotary valve chamber integral therewith, said steam chamber provided with ports to each of the cylinders in the pair, said chamber provided with exhaust ports for each of the cylinders, a common channel connecting the exhaust ports, rotary valve plates mounted in the chamber in operative relation to each of the inlet and exhaust ports, steam inlet ports formed in each plate for registry with the inlet ports to the cylinders, exhaust channels formed in each plate for the combined registry with the inlet and exhaust ports of each cylinder, a cover plate for steam chamber, bearings carried by the plate, shafts journalled in the bearings and extending into the steam chamber, said shafts have slidable splined connection with the valve plates, a common worm gear carried by the drive shaft, worm drive means from the said gear to one of the valve plate shafts, the said valve plate shafts being geared together, worm drive means to the said steam inlet valve for the chamber and a cam device rotatable with the drive shaft and having operative connection with the said bar for limiting the movement thereof in either direction.

5. The structure as recited in claim 4, wherein the said cam is formed in two parts with correspondingly shaped grooves formed in their abutting faces, said grooves being concentric with the said shaft for the major circumference of the cam, said grooves provided with an offset area, the abutting faces of the cam leaving a centrally arranged circumferential slot, a push rod having pivotal connection with one of the connecting rods and the said bar, a guide bracket for the push rod, said push rod provided upon its opposite end with oppositely extending axially aligned cylindrical portions engageable in the grooves of the cam, the movement of the said bar being limited in its travel by the degree of offset of the cam grooves, such movement determining the motion of the rocker arm for raising or lowering the said abutment.

OCTAVIUS J. MORRIS.

REFERENCES CITED

The following references are of record in the file of this patent:

UNITED STATES PATENTS

| Number | Name | Date |
|---|---|---|
| 823,228 | Shepard | June 12, 1906 |
| 832,848 | Croston | Oct. 9, 1906 |
| 834,675 | Lach | Oct. 30, 1906 |
| 863,809 | Schuller | Aug. 20, 1907 |
| 880,333 | Seibert | Feb. 25, 1908 |
| 892,346 | Wood | June 30, 1908 |
| 988,591 | Von Pittler | Apr. 4, 1911 |
| 1,056,833 | Reid | Mar. 25, 1913 |
| 1,348,103 | George | July 27, 1920 |
| 1,509,051 | McBryde | Sept. 16, 1924 |
| 1,771,351 | Reid | July 22, 1930 |
| 1,916,318 | Huber | July 4, 1933 |